UNITED STATES PATENT OFFICE.

HEINRICH L. J. SIEMUND, OF NEW YORK, N. Y.

WELDING COMPOSITION.

967,580.  Specification of Letters Patent.  Patented Aug. 16, 1910.

No Drawing.  Application filed April 28, 1910.  Serial No. 558,188.

*To all whom it may concern:*

Be it known that I, HEINRICH L. J. SIEMUND, a German subject, residing at No. 29 Broadway, New York city, New York, have invented certain new and useful Improvements in Welding Compositions; and I do hereby declare the following to be a full, clear, and exact description of the invention, such as will enable others skilled in the art to which it appertains to make and use the same.

My invention relates to certain new and useful improvements in welding compositions designed to facilitate welding operations, and particularly the welding and repairing of articles and structures of iron and steel under circumstances where the intense heat of the welding operation employed makes it desirable to protect the joint made by the welding or repairing metal from becoming unduly brittle.

I have employed my invention to particular advantage in the welding or repairing of objects and articles of iron and steel by the electric arc welding process, as more particularly described in my allowed application for Letters Patent of the United States, Serial No. 538,812, filed January 19, 1910, wherein the weld or repair is made by establishing an electric arc between the article to be welded or repaired (as, for instance, a marine boiler) and a rod or wire (usually about three-eighths of an inch in diameter) of soft iron coated by or, if hollow, containing the welding composition.

In its preferred form, the welding composition is made up by intimately mixing together its constitutents, in the proportions or in substantially the proportions by measure as follows: one part of boracic acid, one part of pumice stone, one-half part of bicarbonate of sodium, one-half part of lamp black or of powdered charcoal, one-quarter part of chlorid of calcium. The mixing or compounding of these ingredients of the composition I find takes place to the best advantage in a dry state, and, when thus compounded, the composition can be kept without deterioration for any reasonable length of time. When the composition is to be used for the welding operation, the small rod or wire of soft iron constituting the welding or repairing metal for the weld joint or repair, is coated with the composition or, if hollow, is filled with it or coated internally and externally with it. To this end the composition is made into a fairly thin paste by the addition of water, so that it can be applied by a brush to the exterior surface of the welding rod or wire constituting the welding or repairing metal, or, in case the rod or wire is hollow, it may be, in this thin pasty condition, applied in like manner to the exterior surface thereof and poured into the hollow interior, which may be entirely occupied by it or upon which it will form an interior surface coating. In either case, the water is then permitted to evaporate from the composition or, in other words, the composition is permitted to dry upon the rod or wire and will be found to adhere to it in a relatively thin layer. The rod or wire is then adapted to be used as the plus electrode in electric arc welding or repairing of articles of iron or steel, such as marine boilers or the like, and the weld joint or repair will be found to consist of metal of the desired quality as to fiber and toughness, to fulfil practical requirements.

In some instances, I may dispense with the pumice stone and chlorid of calcium of the composition, but I find that in general it is desirable to employ all of the ingredients as specified.

Having thus described my invention, what I claim is:

1. A welding composition containing boracic acid, bicarbonate of sodium and carbon; substantially as described.

2. A welding composition containing boracic acid, pumice stone, bicarbonate of sodium, carbon and chlorid of calcium; substantially as described.

In testimony whereof I affix my signature, in presence of two witnesses.

HEINRICH L. J. SIEMUND.

Witnesses:
 JOHN C. PENNIE,
 ELSA M. GEILFUSS.